United States Patent Office 3,709,882
Patented Jan. 9, 1973

3,709,882
3-NITROSOBENZOXAZINES
Karl Eiter, Cologne, Germany, assignor to Farbenfabriken
Bayer Aktiengesellschaft, Leverkusen, Germany
No Drawing. Filed Mar. 12, 1970, Ser. No. 19,086
Int. Cl. C07d 87/14, 87/06, 85/26
U.S. Cl. 260—244 R                 2 Claims

ABSTRACT OF THE DISCLOSURE

Compounds of the formula:

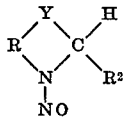

wherein R is bifunctional, aliphatic, aromatic or araliphatic, $R^2$ is hydrogen, aliphatic, aromatic, heterocyclic, —$(CH_2)_x$CHO, where $x$ is 0–6, or phenyl substituted by CHO, Y is —O—, —COO—, —CONH—, —$SO_2$—, —$SO_2O$—, —$SO_2NH$—, —$NR^1$—, —CO—$NR^1$—, or —$SO_2NR^1$—, wherein $R^1$ is aliphatic, aryl or heterocyclic are described. The compounds are useful for their molluscocidal activity, and which may be prepared in a single step by reaction of an appropriate amino alcohol, aldehyde and nitrous acid or a compound yielding nitrous acid.

---

The present invention is concerned with heterocyclic compounds and to a process for their preparation. More particularly the present invention is concerned with heterocyclic compounds of the formula:

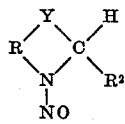   (I)

wherein R is an unsubstituted or substituted bifunctional aliphatic moiety of up to 20 carbon atoms such that Y and N attached to R are separated by not more than 8 carbon atoms which carbon atoms are straight chain or part of a straight chain, branched chain or part of a branched chain or part of a cycloaliphatic moiety, or R is an unsubstituted or substituted bifunctional aromatic moiety such that Y and N attached to R are o-position to each other, or R is an unsubstituted or substituted bifunctional araliphatic moiety such that 2 of the carbon atoms between Y and N attached to R belong to the aromatic ring, $R^2$ is hydrogen, an aliphatic moiety of up to 19 carbon atoms, an aliphatic moiety of up to 19 carbon atoms substituted by at least one hydroxy moiety, an unsubstituted or substituted 5- or 6-membered aromatic of heterocylic moiety, —CHO, —$(CH_2)_n$CHO wherein $n$ is an integer of from 1 to 6, or phenyl substituted by an aldehyde moiety, and Y is —O—, —COO—, —CONH—, —$SO_2$—, —$SO_2O$—, —$SO_2NH$—, $NR_1$—, —CO—$NR_1$— or —$SO_2NR_1$— wherein $R_1$ is an aliphatic moiety, unsubstituted or substituted aryl or a 5- or 6-membered heterocyclic moiety with one nitrogen atom.

In one embodiment of the invention, 3-nitrosobenzoxazines are provided, having the formula:

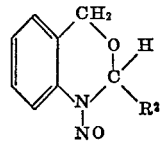

wherein $R^2$ is hydrogen, lower alkyl, lower alkyl substituted by 1 or 2 hydroxy moieties, phenyl, nitrophenyl, methoxyphenyl, furyl, pyridyl or cyclohexenyl.

According to the present invention compounds of the Formula I are produced by reacting a compound of the formula:

$$X—R—NH_2 \quad (II)$$

wherein R is an unsubstituted or substituted bifunctional aliphatic moiety of up to 20 carbon atoms such that X and the amino moiety are separated by not more than 8 carbon atoms which carbon atoms are straight chain or part of a straight chain, branched chain or part of a branched chain, or part of a cycloaliphatic moiety, or R is an unsubstituted or substituted bifunctional aromatic moiety such that X and the amino moiety are in o-position to each other, or R is an unsubstituted or substituted bifunctional araliphatic moiety such that two of the carbon atoms between X and the amino group belong to the aromatic ring, and X is —OH, —$NHR_1$, —COOH, —$COOR_1$, —$CONH_2$, —$CONHR_1$, —$SO_2H$, —$SO_3H$, —$SO_2NH_2$ or —$SO_2NHR_1$, wherein $R_1$ is an aliphatic moiety, unsubstituted or substituted aryl or a 5- or 6-membered heterocyclic moiety with one nitrogen atom, with an approximately equimolar amount of an aldehyde of the formula:

$$R^2—CHO \quad (III)$$

wherein $R^2$ is hydrogen, an aliphatic moiety with up to 19 carbon atoms, an aliphatic moiety with up to 19 carbon atoms substituted by at least one hydroxy moiety, an unsubstituted or substituted 5- or 6-membered aromatic or heterocyclic moiety, —CHO, —$(CH_2)_n$CHO wherein $n$ is an integer from 1 to 6, or phenyl substituted by an aldehyde moiety; and at least one mole of nitrous acid or a compound yielding nitrous acid, at a temperature of from about —30° C. to about +20° C.

The process according to the present invention is preferably carried out at a temperature in the range of from about —5° C. to about +5° C.

The preferred aliphatic moieties for R are straight and branched chain alkyl moieties which may also contain a double bond, i.e. straight or branched chain alkenyl moieties, as well as cycloaliphatic moieties particularly those with 5 or 6 carbon atoms in the ring.

The preferred aromatic moieties for R are those having up to 14 carbon atoms in the aromatic ring. Such aromatic ring systems may also contain up to 2 hetero atoms such as nitrogen, nitrogen and oxygen, nitrogen and sulphur, oxygen, or sulphur.

The preferred araliphatic moieties for R are those having up to 6 carbon atoms in the aliphatic portion (which bears the moiety X) while the aromatic portion is as above defined.

When the aliphatic, aromatic or araliphatic moieties are substituted, the preferred substituents are lower alkyl (especially lower alkyl of 1 to 3 carbon atoms), lower alkoxy, (especially lower alkoxy of 1 to 3 carbon atoms), halogen (especially fluorine, chlorine or bromine), hydroxy or nitro.

The preferred aliphatic moieties for $R_1$ are straight or branched chain alkyl of 1 to 8 carbon atoms and especially 1 to 4 carbon atoms, straight or branched chain alkenyl of 2 to 8 carbon atoms and especially 2 to 4 carbon atoms, as well as 5- or 6-membered cycloaliphatic moieties. The preferred aryl moiety is phenyl and in the case of substituted aryl, the preferred moiety is phenyl substituted by lower alkyl, especially lower alkyl of 1 to 3 carbon atoms, lower alkoxy, especially lower alkoxy of 1 to 3 carbon atoms, halogen (especially fluorine, chlorine or bromine) hydroxy or nitro.

The preferred aliphatic moieties for $R^2$ are straight or branched chain alkyl moieties, preferably lower alkyl, straight or branched alkenyl moieties, preferably lower alkenyl, cycloaliphatic moieties preferably with 5 or 6 carbon atoms in the ring system, and straight or branched chain alkyl (preferably lower alkyl), straight or branched chain alkenyl (preferably lower alkenyl) or cycloaliphatic (preferably with 5 or 6 carbon atoms in the ring system) substituted by 1 to 5 hydroxy moieties. The preferred 5- or 6-membered aromatic heterocyclic moieties are those having oxygen, sulphur or nitrogen as the hetero atom.

The following compounds are representative of those compounds of the Formula II which may be used according to the process of the present invention: 2-methyl-2-amino-propanol-(1), 2-hydroxymethyl-2-aminopropanol-(1), 2-amino-2-methyl-propanediol-(1,3), 2-hydroxymethyl-2-amino-propanediol-(1,3), 1-hydroxy-methyl-1-aminocyclohexane, aminopropanol-(1,3), 2,2-dimethyl-1-amino-propanol-(3), aminobutanol-(1,4), o-aminobenzyl alcohol, anthranilic acid, 2-aminodiphenylamine, anthranilic acid amide and their nuclear substitution products, o-aminobenzene sulphinic acid, o-aminobenzenesulphonic acid, o-aminobenzenesulphonic acid amide, aminobenzenesulphonic acid anilide and their nuclear substitution products.

The following compounds are those representative of aldehydes of the Formula III which can be used according to the process of the present invention: formaldehyde, acetaldehyde, propionaldehyde, p-nitrobenzaldehyde, pyridine-4-aldehyde, pyridine-2-aldehyde, furfurol, glyoxal, glutaraldehyde, phthalaldehyde, terethalaldehyde, glyceroldaldehyde, aldoses, tetroses, pentose, hexoses.

As compounds yielding nitrous acid, the customary sources may be used. The alkali metal (preferably sodium or potassium) and alkaline earth metal nitrites, isoamyl nitrite, and of course nitric oxides may be emphasized.

The process according to the invention is preferably carried out in the presence of water as reaction medium. In some cases it may, however, be expedient also to rise an inert organic solvent as solubiliser, for example ethers (diethyl ether, diisopropyl ether, dibutyl ether), tetrahydrofuran, dioxan, or ketones, such as acetone, diethyl ketone and the like, or dimethyl formamide.

If alkali metal nitrites or alkaline earth metal nitrites are used, the acid necessary for the reaction (halogen hydracid, sulphuric acid or organic acid such as acetic acid) is used in at least the stoichiometrically necessary amount. In the case where the starting compounds of the Formula II are used in the form of their salts, additional acid may also be used, although this is not absolutely necessary.

The process according to the invention is illustrated by the example of the reaction of 1-aminopropanol-3 with formaldehyde:

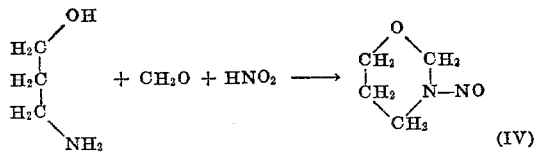

(IV)

The working up of the reaction mixtures may be effected in customary manner.

The compounds of the present invention are particularly useful for their molluscocidal activity but may also be used as crop protective agents, as activators for the preparation of synthetic compounds, as well as stabilizers for synthetic compounds. Table A illustrates the molluscocidal activity.

Slug test: To produce a suitable preparation of active compound, 3 parts by weight of active compound are mixed with 2.8 parts by weight of highly dispersed silicic acid and 4.2 parts by weight of talc.

To prepare a bait mixture containing 0.75% of active compound, 0.1 g. of this concentrate of active compound is intimately mixed with 3.9 g. of fine wheat bran and with this there is covered uniformly the inside surface of a Petri dish of 15 cm. diameter, which inside surface has been completely lined with filter paper and moistened with water. Two slugs are then put in an the lethality result is determined on each of the 3 following days.

The active compounds, results and the nature of the slugs used can be seen from Table A:

TABLE A.—SLUG TEST
[Red slug (*Arion rufus*) test animal]

| Compound | Number of tests | Findings after 3 days | |
|---|---|---|---|
| | | Dead gastropods/gastropods used | Mortality, percent |
| (1) | 2 | 2/2 | 100 |
| (2) | 2 | 2/2 | 100 |
| (3) | 2 | 2/2 | 100 |
| (4) | 2 | 2/2 | 100 |
| Untreated control | 2 | 0/2 | 0 |

The following representative examples more particularly illustrate the compounds of the present invention. Temperatures are given in ° C.

EXAMPLE 1

3-nitroso-5,6-tetrahydro-(4H)-1,3-oxazine

(V)

200 ml. glacial acetic acid are added at 0° C. to 150 g. (2 M) 1-aminopropanol-(3) in 300 ml. ether; 300 ml. of a 30% by weight formalin solution are now added, and a solution of 140 g. $NaNO_2$ in 250 ml. water is added dropwise at this temperature. After stirring for 5 hours, neutralization is effected with solid sodium carbonate and the reaction solution is extracted with ether. After drying and evaporation of the ether, there remain behind 124 g. reaction product, B.P. 51°/0.1 mm. Hg, $n_D^{20}$ 1.4850.

EXAMPLE 2

3-nitroso-4,4-dimethyldihydro-(4,5)-oxazolidine-(1,3)

(VI)

178 g. (2 M) 2-amino-2-methylpropanol-(1) are suspended in 500 ml. ether, and 200 ml. glacial acetic acid are introduced at 0° C.; after addition of 200 ml. of a 30% by weight Formalin solution, a solution of 140 g. NaNO$_2$ in 250 ml. H$_2$O is added dropwise at 0° C. The mixture is left to stand overnight; rendering alkaline is effected, followed by extraction. After working up, there remain 172 g. reaction product which distill at 15 mm. Hg and 95°. Yellow oil, $n_D^{20}$ 1.4650, yield: 66%.

EXAMPLE 3

The following compounds are produced according to the process illustrated above and are produced by reacting the compounds listed below:

| Amino alcohol | Carbonyl component | Reaction product | Yield, percent |
|---|---|---|---|
| H$_2$NCH$_2$CH$_2$CH$_2$OH | CH$_3$CH$_2$CHO | tetrahydro-1,3-oxazine with 2-ethyl, N-NO | 50 |
| H$_2$NCH$_2$CH$_2$CH$_2$OH | C$_6$H$_5$CHO | tetrahydro-1,3-oxazine with 2-phenyl, N-NO | 56 |
| H$_2$NCH$_2$CH$_2$CH$_2$OH | OCH—C$_6$H$_4$—NO$_2$ | tetrahydro-1,3-oxazine with 2-(4-nitrophenyl), N-NO (M.P. 95°) | 70 |
| H$_2$NCH$_2$CH$_2$CH$_2$OH | OHC—C$_6$H$_4$—OCH$_3$ | tetrahydro-1,3-oxazine with 2-(4-methoxyphenyl), N-NO (M.P. 30°) | 20 |
| H$_2$NCH$_2$CH$_2$CH$_2$OH | furan-2-CHO | tetrahydro-1,3-oxazine with 2-(2-furyl), N-NO | 30 |
| H$_2$NCH$_2$CH$_2$CH$_2$OH | 4-pyridyl-CHO | tetrahydro-1,3-oxazine with 2-(4-pyridyl), N-NO | 80 |
| NH$_2$—CH$_2$CH$_2$CH$_2$OH | 2-pyridyl-CHO | tetrahydro-1,3-oxazine with 2-(2-pyridyl), N-NO | 60 |
| NH$_2$—CH$_2$—C(CH$_3$)$_2$—CH$_2$OH | OHC—CH(CH$_3$)—CH$_2$—CH$_3$ | 5,5-dimethyl-tetrahydro-1,3-oxazine with 2-(sec-butyl), N-NO | 40 |
| NH$_2$—CH$_2$—C(CH$_3$)$_2$—CH$_2$OH | 2-pyridyl-CHO | 5,5-dimethyl-tetrahydro-1,3-oxazine with 2-(2-pyridyl), N-NO | 40 |
| 2-amino-cyclohexyl-CH$_2$OH | C$_6$H$_5$CHO | fused cyclohexane-oxazine with 2-phenyl, N-NO (M.P. 62.5°) | 20 |

| Amino alcohol | Carbonyl component | Reaction product | Yield, percent |
|---|---|---|---|
| CH₃—C(NH₂)(CH₃)—CH₂OH | C₆H₅CHO | 2-phenyl-4,4-dimethyl-3-nitroso-oxazolidine | 20 |
| CH₃—C(NH₂)(CH₃)—CH₂OH | pyridine-2-CHO | 2-(2-pyridyl)-4,4-dimethyl-3-nitroso-oxazolidine, M.P. 55° | 55 |
| HOH₂C—C(CH₃)(NH₂)—CH₂OH | C₆H₅CHO | 4-methyl-4-hydroxymethyl-2-phenyl-3-nitroso-oxazolidine, M.P. 120° | 10 |
| CH₃—C(NH₂)(CH₃)—CH₂OH | CH₃CH₂CHO | 2-ethyl-4,4-dimethyl-3-nitroso-oxazolidine, B.P. 61°/0.05 mm. Hg | 63 |
| HOH₂C—C(CH₃)(NH₂)—CH₂OH | CH₂O | 4-methyl-4-hydroxymethyl-3-nitroso-oxazolidine, M.P. 42° | 20 |
| (HOH₂C)₃C—NH₂ | CH₂O | 4,4-bis(hydroxymethyl)-3-nitroso-oxazolidine, M.P. 64° | 40 |
| 2-aminobenzoic acid | CH₂O | 3-nitroso-2,3-dihydro-4H-benzo[1,3]oxazin-4-one, M.P. 105° | 30 |
| 2-aminobenzyl alcohol | CH₂O | 3-nitroso-3,4-dihydro-2H-benzo[1,3]oxazine, M.P. 36° | 31 |
| H₂N—CH₂CH₂CH₂OH | OHC—CHO | bis-nitroso bicyclic oxazolidine, M.P. 207–208° | 30 |

| Amino alcohol | Carbonyl component | Reaction product | Yield, percent |
|---|---|---|---|
| 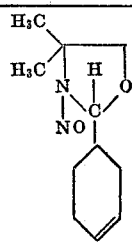 | 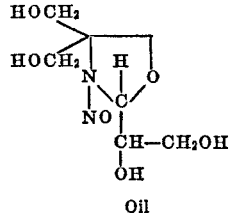 | 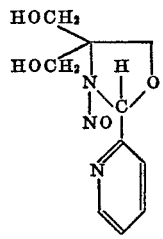 M.P. 57.5° | 30 |
| HOCH₂  CH₂OH  \/  HOCH₂  NH₂ | OHC—CHOH—CH₂OH | HOCH₂  \  HOCH₂—N  H  \ / O  N  \C/  NO |  CH—CH₂OH  |  OH  Oil | 40 |
| HOH₂C  \  C—NH₂  /  HOH₂C  CH₂OH | 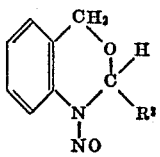 | HOCH₂  \  HOCH₂—N  H  \ / O  N  \C/  NO |  pyridyl | 20 |

The compounds of the present invention may be formulated into molluscocidal compositions by techniques which are per se known by combining the compounds with any of the known acceptable non-toxic inert diluents or carriers conventionally used. The compounds are administered in the same routes of administration and in the same general dosage ranges as known molluscocidal compounds.

With regard to the other utilities, the compounds of the present invention are used in the same general manner and amount as known compounds having such uses.

What is claimed is:

1. A compound of the formula:

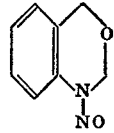

wherein $R^2$ is hydrogen, lower alkyl, lower alkyl substituted by 1 or 2 hydroxy moieties, phenyl, nitrophenyl, methoxyphenyl, furyl, pyridyl or cyclohexenyl.

2. A compound according to claim 1 of the formula:

References Cited

Kotani et al.: Chem. Abst. vol. 71, No. 124353c (1969, Dec. 22, 1969).

Nace et al.: Chem. Abst. vol. 47, column 12,355 (1953).

Piotrowska et al.: Chem. Abst. vol. 50, column 13,935 (1956).

Urbanski et al.: Chem. Abst. vol. 51, column 1,186 (1957).

Goldberg et al.: J. Amer. Chem. Soc. vol. 75, pp. 6260–2 (1953).

NATALIE TROUSOF, Primary Examiner

U.S. Cl. X.R.

260—246 R, 296 R, 296 B, 307 F, 307 D, 333; 424—244, 248, 263, 272